April 19, 1966 E. H. TURNER 3,247,472

MICROWAVE DEVICES EXHIBITING MODE CONVERSION
USING A RESONANTLY BIASED
GYROMAGNETIC MATERIAL

Filed March 6, 1963 5 Sheets-Sheet 1

INVENTOR
E. H. TURNER
BY
Lyman Sherman
ATTORNEY

April 19, 1966 E. H. TURNER 3,247,472

MICROWAVE DEVICES EXHIBITING MODE CONVERSION USING A RESONANTLY BIASED GYROMAGNETIC MATERIAL

Filed March 6, 1963 5 Sheets-Sheet 4

United States Patent Office 3,247,472
Patented Apr. 19, 1966

3,247,472
MICROWAVE DEVICES EXHIBITING MODE CONVERSION USING A RESONANTLY BIASED GYROMAGNETIC MATERIAL
Edward H. Turner, Middletown, N.J., assignor to Bell Telephone Laboratories Incorporated, New York, N.Y., a corporation of New York
Filed Mar. 6, 1963, Ser. No. 263,193
12 Claims. (Cl. 333—21)

This invention relates to electromagnetic wave transmission systems and more particularly to transmission structures having nonreciprocal transmission properties for use in such systems.

The use of materials having gyromagnetic properties to obtain both reciprocal and nonreciprocal effects in microwave transmission circuits is widely known and has found numerous and varied applications in electromagnetic wave systems. For example, in United States Patent 3,040,276 issued to R. F. Trambarulo and E. H. Turner, it is shown that a sample of resonantly biased gyromagnetic material behaves as a rotating point magnetic dipole which, when energized by an incident microwave field, radiates microwave energy. It was further explained therein that in a single mode waveguide the amplitude and phase of the radiated microwave energy can be controlled so as to completely cancel the incident field with substantially all the power contained in said wave being absorbed in the sample. It was also shown that if a sample of appropriate size is placed in a position of circular polarization, the structure can be represented by an equivalent circuit comprising a three-port circulator having a resonant cavity connected to one of the ports through a quarter wave section of line.

It has since been discovered, however, that the principles described in the above-mentioned patent and its equivalent circuit representation are but a very special case of a much broader class of phenomena. In particular, it has been discovered that when placed in a multimode wave path, an element of gyromagnetic material radiates energy in all other modes capable of being supported by said path in addition to the energizing mode.

It is, therefore, an object of this invention to produce mode conversion in an electromagnetic wave transmission system using resonantly biased gyromagnetic material.

Recognizing that an element of resonantly biased gyromagnetic material behaves as a rotating point magnetic dipole which is capable of radiating microwave wave energy in modes other than that of the energizing mode, it is proposed to utilize this property of gyromagnetic materials to produce mode conversion in electromagnetic wave systems and to further utilize this effect to produce microwave devices based upon mode conversion effects.

In accordance with the invention a resonantly biased element of gyromagnetic material is placed in a multimode wave path. Upon being energized by an incident microwave field, the sample radiates wave energy in a plurality of wave modes.

In a first embodiment of the invention the wave path and the gyromagnetic sample are proportioned to convert the incident wave energy from a first mode of propagation to a second mode of propagation.

In a second embodiment of the invention, mode conversion effects are utilized to produce an isolator for $TE_{20}$ mode wave energy.

In a third embodiment of the invention, mode conversion effects are used to obtain frequency discrimination.

These and other objects and advantages, the nature of the present invention, and its various features, will appear more fully upon consideration of the various illustrative embodiments now to be described in detail in connection with the accompanying drawings, in which:

FIG. 1 shows, in perspective, a $TE_{10}$ to $TE_{20}$ mode converter in accordance with the invention;

FIG. 2, given for purposes of explanation, is an equivalent circuit diagram of a gyromagnetic element in a multimode waveguide;

Figure 3:
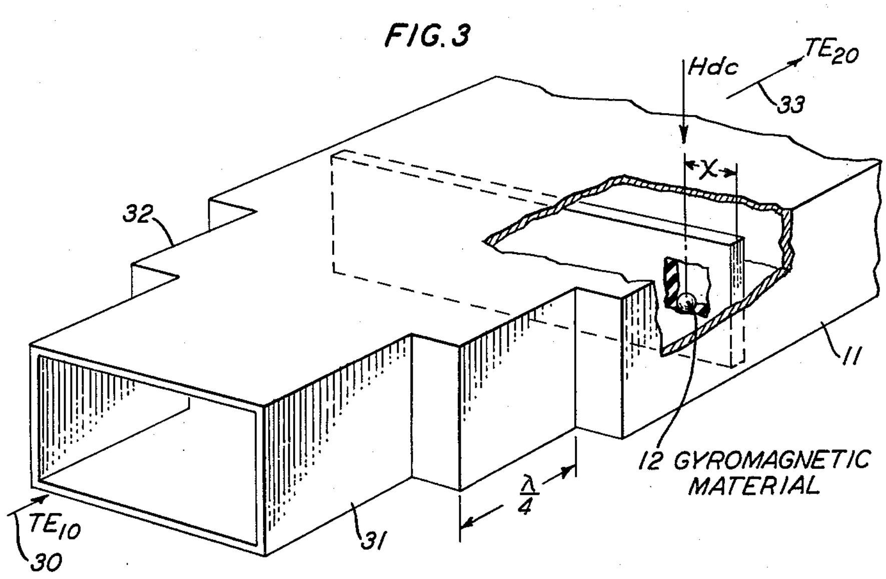
FIG. 3 shows, in perspective, a $TE_{10}$ to $TE_{20}$ mode converter including a quarter-wave waveguide matching section.
Figure 10:
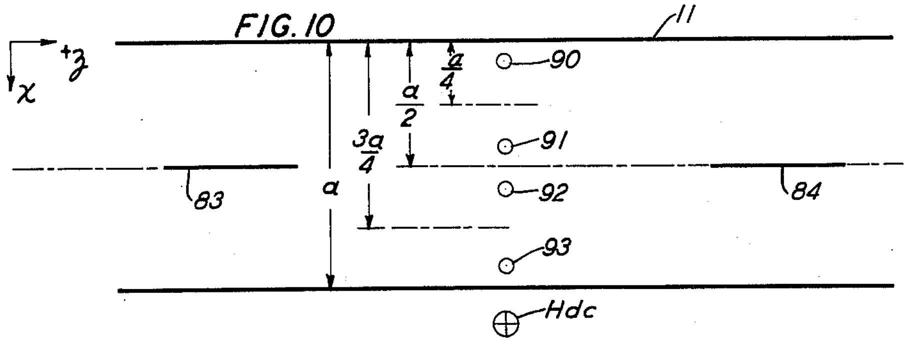
Figure 5:
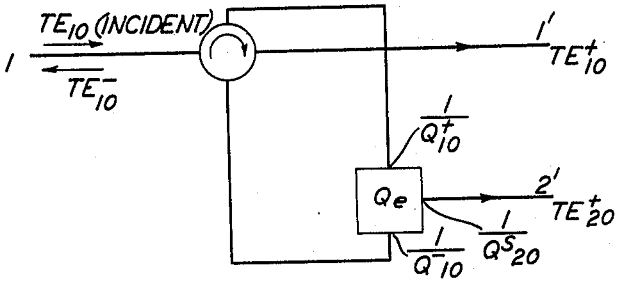
Figure 7A:
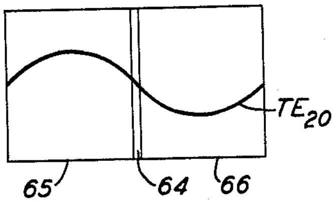
Figure 7B:
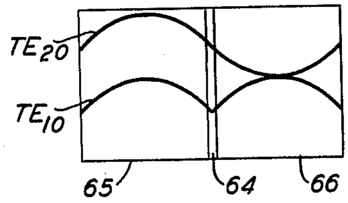
Figure 8:
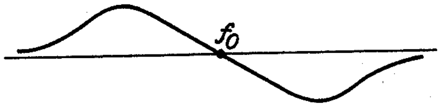
Figure 6:
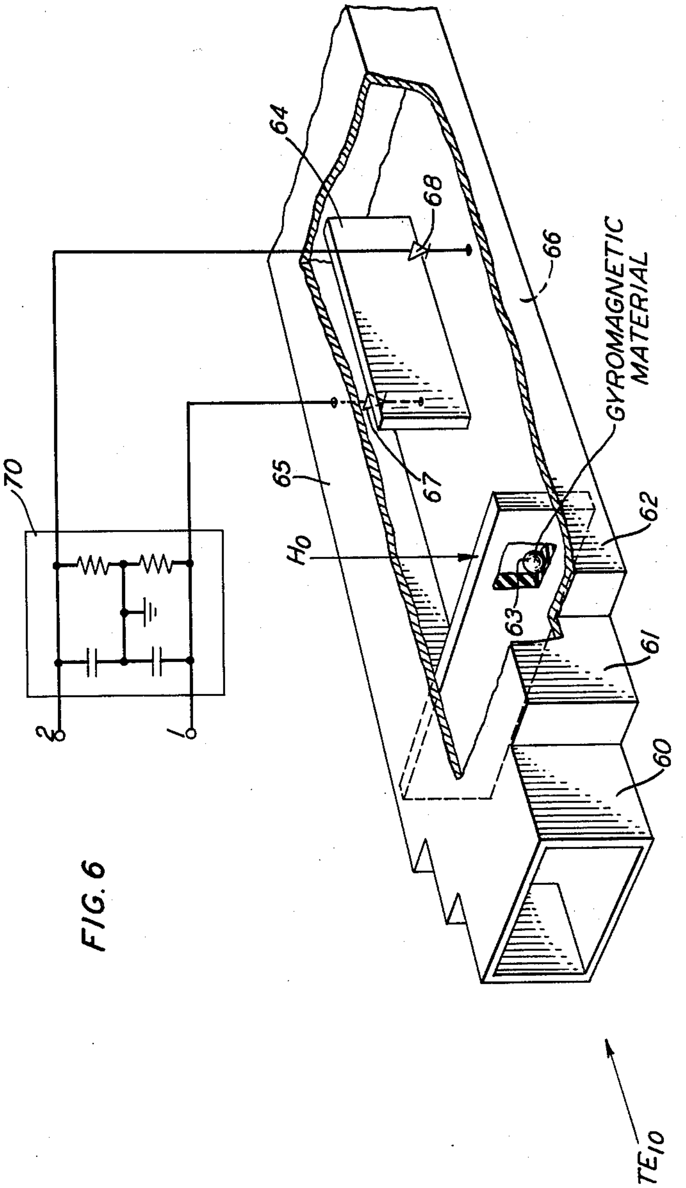
Figure 9:
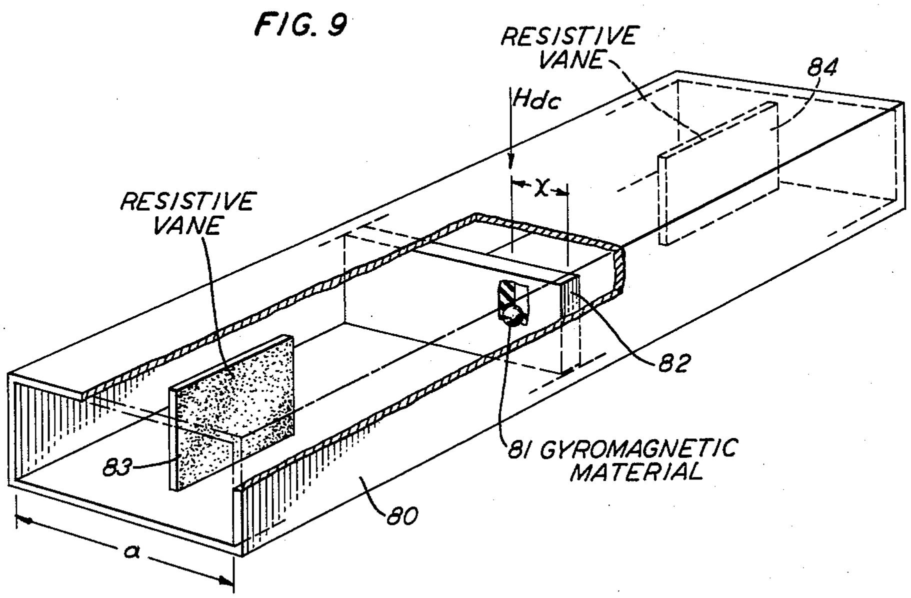
Figure 11:
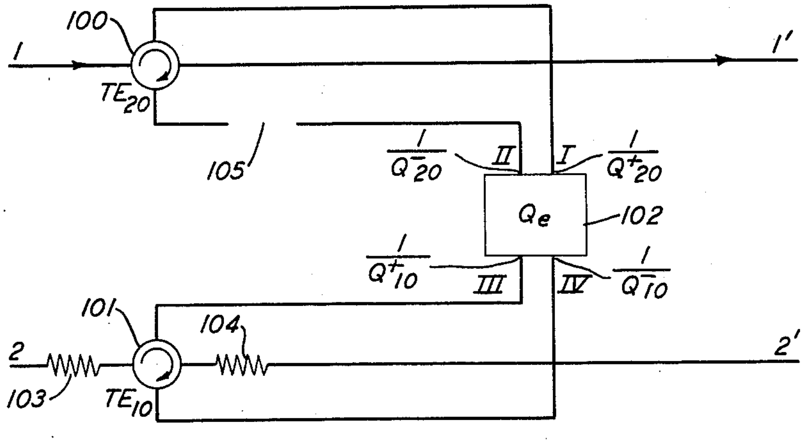

FIG. 5, given for purposes of explanation, is the equivalent circuit of the embodiment of FIG. 3;

FIG. 6 shows, in perspective, a mode converter in accordance with the invention used to produce frequency discrimination;

FIGS. 7A and 7B, given for purposes of explanation, show the field configuration in the discriminator of FIG. 6 at resonance and off resonance, respectively;

FIG. 8, given for purposes of explanation, shows a typical discriminator curve;

FIG. 9 shows, in perspective, a $TE_{20}$ mode isolator;

FIG. 10, given for purposes of explanation, indicates the regions of circular polarization for $TE_{20}$ mode wave energy; and FIG. 11 gives the equivalent circuit of the $TE_{20}$ mode isolator of FIG. 9.

Figure 1:
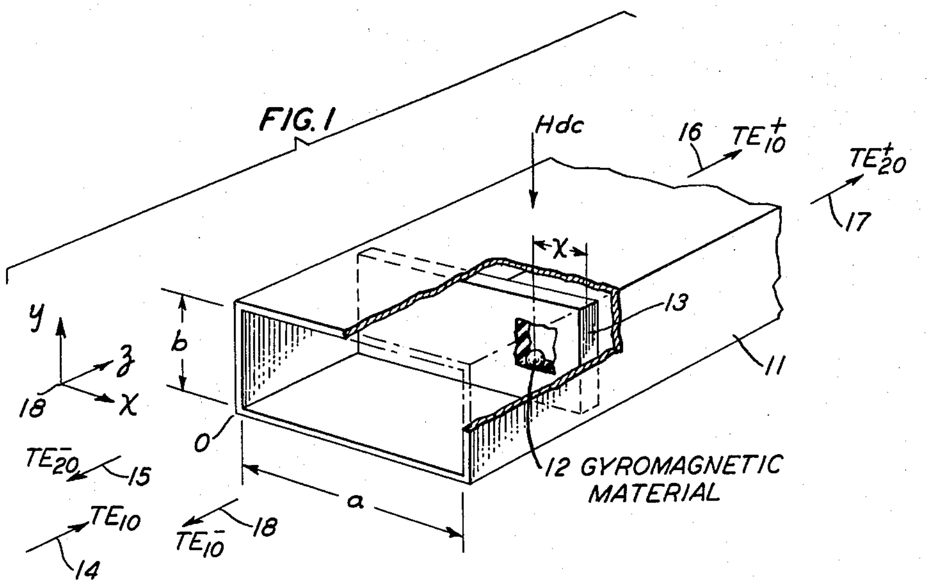

Referring specifically to FIG. 1, a mode converter is shown connected and utilized in accordance with the principles of the invention. The converter comprises a section 11 of bounded electrical transmission line for guiding wave energy which can be a rectangular waveguide of the metallic shield type having a wide internal cross-sectional dimension $a$ of at least one wavelength of the wave energy to be propagated therethrough and a narrow dimension $b$ which is less than half a wavelength. So proportioned guide 11 is supportive of the dominant $TE_{10}$ mode and other higher order modes including, at least, the $TE_{20}$ mode.

Located midway between the wide walls and at a distance $x$ from one of the narrow walls is a sphere 12 of gyromagnetic material suitably supported by means of a slab 13, of low-loss dielectric material, which extends completely across the guide. The term "gyromagnetic material" is employed here in its accepted sense as designating the class of magnetically polarizable materials having unpaired spin systems involving portions of the atoms thtereof that are capable of being aligned by an external magnetic polarizing field and which exhibit a precessional motion at a frequency within the range contemplated by the invention under the combined influence of said polarizing field and an orthogonally directed varying magnetic field component. This precessional motion is characterized as having an angular momentum and a magnetic moment. Typical of such materials are ionized gases, paramagnetic materials and ferromagnetic materials, the latter including the spinels such as, magnesium aluminum ferrite, aluminum zinc ferrite and the rare earth iron oxides having a garnet-like structure of the formula $A_3B_5O_{12}$ where O is oxygen, A is at least one element selected from the group consisting of yttrium and the rare earths having an atomic number between 62 and 71 inclusive, and B is iron optionally contining at least one element selected from the group consisting of gallium, aluminum, scandium, indium and chromium.

Element 12 is biased by a steady magnetic field, $H_{dc}$, in a direction normal to the direction of propagation of wave energy along the waveguide. This field can be supplied by an electric solenoid, by a permanent magnet structure, or element 12 may itself be permanently magnetized, if desired.

In operation, dominant mode wave energy is applied to guide 11, as indicated by arrow 14. Upon impinging upon sphere 12, the gyromagnetic material is energized and caused to reradiate wave energy. In the most general case, energy is radiated away from the sample in both directions along guide 11 and in all modes capable of being supported by the waveguide.

To understand the operation of the several devices to be described hereinafter, let us set forth the general scattering formulae for a multimode rectangular waveguide. We assume an incident wave in the $(pq)$ mode; that is, it may be a $TE_{pq}$ mode wave or a $TM_{pq}$ mode wave. This mode carries energy which, in the general case, is (1) Partially absorbed in the gyromagnetic sample,
(2) Partially reflected from the gyromagnetic sample in the same $(pq)$ mode,
(3) Partially transmitted in the same $(pq)$ mode,
(4) Partially reflected in all $(rs)$ modes which can propagate in the wave path, and
(5) Partially transmitted in all $(rs)$ modes which can propagate in the wave path.

The fractional power absorbed in the sample is given by $$P_a=\frac{4Q_e^2}{Q_eQ_{pq}^+} \qquad (1)$$

where $Q_e$ is the intrinsic Q of the gyromagnetic element defined as $$Q_e=\frac{f_0}{\Delta f}$$

where $f_0$ is the gyromagnetic resonant frequency of the sample,
$\Delta f$ is the line width of the gyromagnetic sample at the half-power points,
$1/Q_{pq}^+$ is a measure of the loading produced by the forward propagating component of the incident wave upon the gyromagnetic material whose amplitude is a function of the volume of the gyromagnetic material, its magnetization, its location in the guide, the guide dimensions and the frequency, and
$Q_e$ is the total loaded Q of the gyromagnetic sample in its particular environment given by $$\frac{1}{Q_e}=\frac{1}{Q_e}+\sum_{rs}\left(\frac{1}{Q_{rs}^+}+\frac{1}{Q_{rs}^-}\right) \qquad (2)$$

summed over all mode indices representing propagating modes including the incident mode.

The power reflected from the gyromagnetic sample in the incident $(pq)$ mode is $$P_{pq}^-=4Q_e^2\left(\frac{1}{Q_{pq}^+}\right)\left(\frac{1}{Q_{pq}^-}\right) \qquad (3)$$

where:

$1/Q_{pq}^{\pm}$ are measures of the additional external loading upon the gyromagnetic sample associated with the transmitted and reflected components of the incident wave.

The power transmitted in the incident $(pq)$ mode is $$P_{pq}^+=Q_e^2\left[\left(\frac{1}{Q_e}-\frac{2}{Q_{pq}^+}\right)\right]^2 \qquad (4)$$

The power scattered into the $(rs)$ mode and reflected back towards the source is $$P_{rs}^-=\frac{4Q_e^2}{Q_{pq}^+Q_{rs}^-} \qquad (5)$$

The power scattered into the $(rs)$ mode and transmitted forward is $$P_{rs}^+=\frac{4Q_e^2}{Q_{pq}^+Q_{rs}^+} \qquad (6)$$

where:

$1/Q_{rs}^+$ are measures of the additional external loading upon the gyromagnetic material associated with the transmitted and reflected components, respectively, of the $(rs)$ mode.

In terms of the parameters of the wave path $$\frac{1}{Q_{rs}^+}=\frac{\omega\mu Mv}{8H_{dc}P_{rs}}(H^-_{x(rs)}-iH^-_{z(rs)})^2 \qquad (7)$$

$$\frac{1}{Q_{rs}^-}=\frac{\omega\mu Mv}{8H_{dc}P_{rs}}(H^+_{x(rs)}-iH^+_{z(rs)})^2 \qquad (8)$$

where:

$\omega$ is the angular frequency of the wave energy,
$\mu$ is the permeability of the wave path,
M is the saturation magnetization of the gyromagnetic material, and
$v$ is the volume of the gyromagnetic material.

$H_{x(rs)}^-$, $H_{x(rs)}^+$, $H_{z(rs)}^-$ and $H_{z(rs)}^+$ are the unit amplitudes for the reflected $(-)$ and forward propagating $(+)$ components of magnetic field in the $x$ and $z$ directions, respectively, associated with the $(rs)$ mode and are given for the TE modes in terms of the width $a$ and the height $b$ of the waveguide as $$H^+_{x(rs)}=\left[\frac{2\pi^2r}{\omega\mu a\lambda_{rs}}\right]\sin\frac{\pi xr}{a}\cos\frac{s\pi y}{b}\epsilon^{-i\frac{2\pi z}{\lambda_{rs}}} \qquad (9)$$

$$H^-_{x(rs)}=\left[\frac{2\pi^2r}{\omega\mu a\lambda_{rs}}\right]\sin\frac{\pi xr}{a}\cos\frac{\pi ys}{b}\epsilon^{+i\frac{2\pi z}{\lambda_{rs}}} \qquad (10)$$

$$H^+_{z(rs)}=-\frac{i}{\omega\mu}\left[\left(\frac{r\pi}{a}\right)^2+\left(\frac{s\pi}{b}\right)^2\right]\cos\frac{\pi xr}{a}\cos\frac{\pi ys}{b}\epsilon^{-i\frac{2\pi z}{\lambda_{rs}}} \qquad (11)$$

$$H^-_{z(rs)}=+\frac{i}{\omega\mu}\left[\left(\frac{r\pi}{a}\right)^2+\left(\frac{s\pi}{b}\right)^2\right]\cos\frac{xr}{a}\cos\frac{\pi ys}{b}\epsilon^{+i\frac{2\pi z}{\lambda_{rs}}} \qquad (12)$$

where:

$\lambda_{rs}$ is the guide wavelength of the $(rs)$ mode, and
$P_{rs}$ is the power carried by a wave of unit amplitude as given by $$P_{rs}=\frac{\pi ab}{\epsilon_p\epsilon_q\omega\mu\lambda_{rs}}\left[\left(\frac{r\pi}{a}\right)^2+\left(\frac{\pi s}{b}\right)^2\right] \qquad (13)$$

where:

$\epsilon_p=2$ if $r\neq0$,
$\epsilon_p=1$ if $r=0$,
$\epsilon_p=2$ if $s\neq0$, and
$\epsilon_p=1$ if $s=0$.

Figure 2:
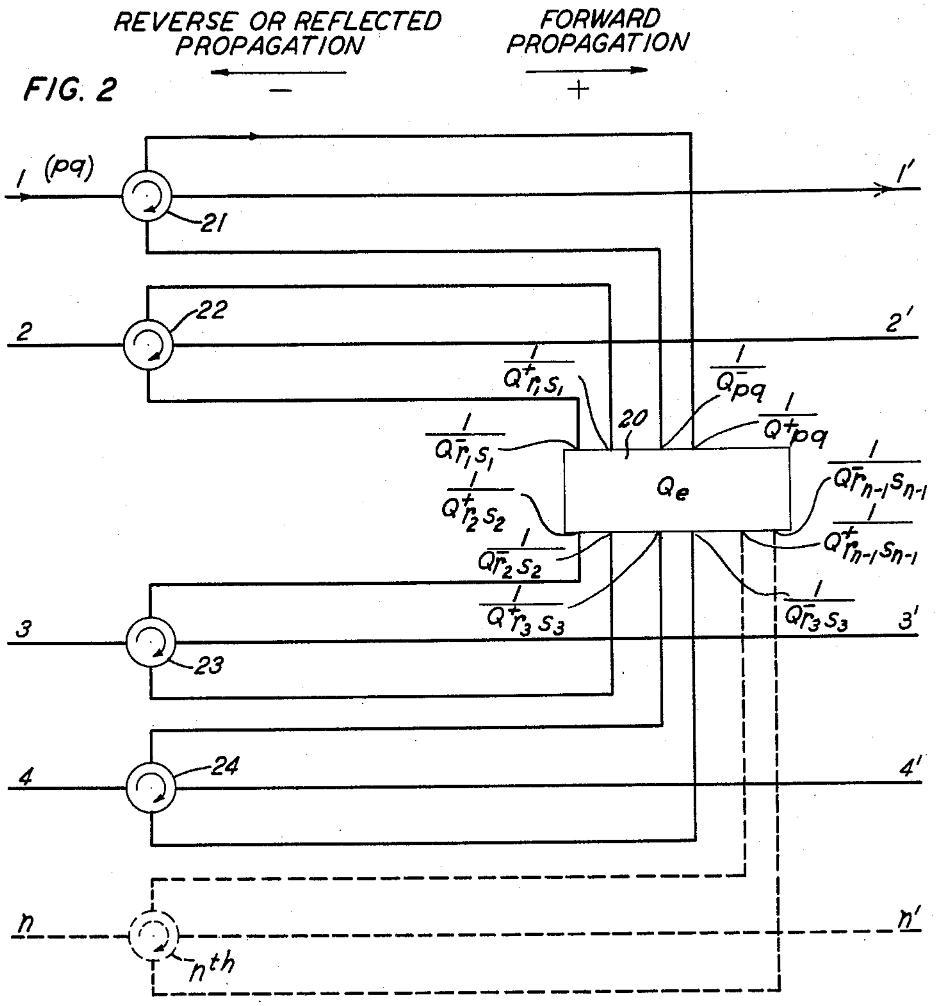

A generalized equivalent circuit of the above-described circuit is given in FIG. 2 in which terminals 1, 2, 3, 4 . . . $n$ represent the input end of a multimode waveguide supportive of modes 1, 2, 3 . . . $n$ and terminals 1′, 2′, 3′, 4′ . . . $n'$ represent the output end of the waveguide for said modes. Circulators 21, 22, 23, 24 . . . $n$ and cavity 20 represent the equivalent circuit of the gyromagnetic material with the various $1/Q$ designations representing the loading upon the gyromagnetic material for the incident mode and for various modes produced by the scattering of the incident wave energy. Thus, for example, in the equivalent circuit of FIG. 2, the intrinsic Q of the material is $Q_e$. The portion of the incident wave energy in the incident $(pq)$ mode that continues to propagate in the forward direction produces a loading given by $$\frac{1}{Q_{pq}^+}$$

while the reflected portion of the incident mode wave energy produces a loading given by $$\frac{1}{Q_{pq}^{-}}$$

Similarly, any of the propagating modes generated by the scattering effect produce loadings given by the appropriate $1/Q$ designation.

Referring again to FIG. 1, it is assumed for the purposes of illustration that guide 11 is proportioned to support the $TE_{10}$ and the $TE_{20}$ mode waves only. Accordingly, wave energy applied to guide 11 in the $TE_{10}$ mode, as indicated by the arrow 14, excites the gyromagnetic material 12 and, in the most general case, reradiates wave energy in the $TE_{10}$ mode and in the $TE_{20}$ mode. Wave energy in the $TE_{10}$ mode includes a reflected component $TE_{10}^{-}$ indicated by arrow 18 and a forward propagating component $TE_{10}^{+}$ indicated by arrow 16. In addition, there is a backward propagating component in the $TE_{20}$ mode, $TE_{20}^{-}$, indicated by arrow 15 and a forward propagating component $TE_{20}^{+}$ indicated by arrow 17. The relative fractional powers for the various components are given by Equations 3 through 6. The portion of the incident power absorbed in the gyromagnetic material is given by Equation 1.

To produce efficient mode conversion, however, there is preferably no reflected component of wave energy in either the $TE_{10}$ mode or $TE_{20}$ mode or any component of $TE_{10}$ mode wave energy propagated in the forward direction. Thus, the components of wave energy designated $TE_{10}^{-}$, $TE_{10}^{+}$ and $TE_{20}^{-}$ are preferably zero. Referring to Equations 3 through 5, this would means that $P_{10}^{-}$, $P_{10}^{+}$ and $P_{20}^{-}$ are zero and all the incident power (less the loss as given by Equation 1 goes into the $P_{20}^{+}$ wave defined by Equation 6.

It can be shown, however, that in a physically realizable system the three Equations 3, 4 and 5, cannot all be equated to zero at any one time. This means that in the absence of some special provisions, some of the incident wave energy is lost by being reflected in either the $TE_{10}$ or $TE_{20}$ mode or by being reradiated in the forward direction in the $TE_{10}$ mode.

To recover the reflected component of $TE_{20}$ mode wave energy and thereby improve the mode conversion efficiency, the mode converter of FIG. 1 is modified by the addition of a section of dominant mode waveguide and a transition section. Such a modified arrangement is shown in FIG. 3 wherein the incident $TE_{10}$ wave energy, indicated by an arrow 30, is applied to one end of waveguide 11 from a dominant mode waveguide 31 through a matching section 32. The latter can be a tapered section (not shown), or a quarter-wave matching section as shown in FIG. 3.

Since waveguide 31 cannot support $TE_{20}$ mode wave energy, the $TE_{20}$ mode energy can only propagate in the forward direction, indicated by the arrow 33. Any $TE_{20}$ mode wave energy radiated towards guide 31 will be reflected back towards guide 11. By properly spacing the gyromagnetic material 12 from the transision section, the reflected and the forward radiated $TE_{20}$ mode wave energy can be made to add for maximum mode conversion. Means (not shown) for utilizing the resulting $TE_{20}$ mode wave energy are coupled to the other end of guide 11.

Figure 4:
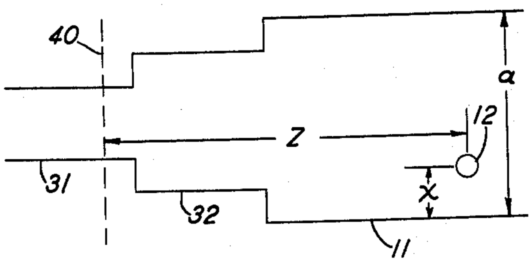
FIG. 4 is a sechematic representation of the embodiment of FIG. 3.

Referring to FIG. 4, which shows schematically the arrangement of FIG. 3, element 12 is located a distance $x$ from one of the narrow walls of guide 11 and a distance $z$ from an effective shorting plane 40. The latter is a virtual short as seen by $TE_{20}$ mode wave energy radiated back towards the dominant mode guide 31.

The equivalent circuit of the embodiment of FIG. 3 is shown in FIG. 5. The various Q designations are as given in connection with FIG. 2. The designation $1/Q_{20}^{s}$ refers to the effective loading produced by the $TE_{20}$ mode energy in the presence of the virtual short.

With unit power in the $TE_{10}$ mode incident upon terminal 1, the power radiated back and out of terminal 1 in the $TE_{10}$ mode (designated $TE_{10}^{-}$) is given by $$P_{10}^{-}=\frac{4Q_L^2}{Q_{10}^{+}Q_{10}^{-}} \tag{14}$$

The $TE_{10}$ power out of terminal 1' (designated $TE_{10}^{+}$)

$$P_{10}^{+}=Q_L^2\left[\frac{1}{Q_L}-\frac{2}{Q_{10}}\right]^2 \tag{15}$$

and the $TE_{20}$ power out of terminal 2' (designated $TE_{20}^{+}$) is $$P_{20}^{+}=\frac{4P_L^2}{Q_{10}^{+}Q_{20}^{s}} \tag{16}$$

where $1/Q_{20}^{s}$ is the equivalent loading on the gyromagnetic material due to the $TE_{20}$ wave energy including the effect of the virtual short.

The power dissipated in the gyromagnetic material is $$P_a=\frac{4Q_L^2}{Q_{10}^{+}Q_e} \tag{17}$$

The various Q's are given by $$\frac{1}{Q_{10}^{+}}=\frac{\pi M v}{2a^2bH_0}\left\{\sqrt{\frac{2a}{\lambda_{10}}}\sin\left(\frac{\pi x}{a}\right)+\sqrt{\frac{\lambda_{10}}{2a}}\cos\left(\frac{\pi x}{a}\right)\right\}^2 \tag{18}$$

$$\frac{1}{Q_{10}^{-}}=\frac{\pi M v}{2a^2bH_0}\left\{\sqrt{\frac{2a}{\lambda_{10}}}\sin\left(\frac{\pi x}{a}\right)-\sqrt{\frac{\lambda_{10}}{2a}}\cos\left(\frac{\pi x}{a}\right)\right\}^2 \tag{19}$$

$$\frac{1}{Q_e}=\frac{\Delta f}{f_0}$$

or, for a sphere, $$\frac{1}{Q_e}=\frac{2\Delta H_{\frac{1}{2}\frac{1}{2}}}{H_0} \tag{20}$$

$$\frac{1}{Q_{20}^{s}}=\frac{4\pi M v}{a^2bH_0}\left\{\frac{a}{\lambda_{20}}\sin^2\left(\frac{2\pi x}{a}\right)\cos^2\left(\frac{2\pi z_0}{\lambda_{20}}\right)+\frac{\lambda_{20}}{a}\cos^2\left(\frac{2\pi x}{a}\right)\sin^2\left(\frac{2\pi z_0}{\lambda_{20}}\right)\right\} \tag{21}$$

where:

M is the saturation magnetization of the gyromagnetic material,
$H_0$ is the applied field to produce gyromagnetic resonance at the operating frequency,
$v$ is the volume of the gyromagnetic material,
$b$ is the guide height,
$a$ is the guide width,
$\lambda_{10}$ is the guide wavelength for the $TE_{10}$ mode,
$\lambda_{20}$ is the guide wavelength for the $TE_{20}$ mode, and
$z_0$ is the distance of the gyromagnetic material from the virtual short.

Ideally, all the power incident in the $TE_{10}$ mode would be converted to $TE_{20}$ mode wave energy. This requires that $P_{10}^{-}=P_{10}^{+}=0$ and that $P_{20}^{+}$ is a maximum. For $P_{10}^{-}$ to be zero requires that the gyromagnetic material be located in a region of circular polarization for $TE_{10}$ for which $$\frac{1}{Q_{10}^{-}}=0$$

If $P_{10}^{+}$ is also equal to zero, it is further required from Equation 15 that $$\frac{1}{Q_L}=\frac{2}{Q_{10}^{+}}$$

or, from Equation 2, that $$\frac{1}{Q_{10}^{+}}=\frac{1}{Q_e}+\frac{1}{Q_{20}^{s}}$$

However, if $$\frac{1}{Q_{10}^-}=0 \text{ then } \frac{1}{Q_{20}^s}>\frac{1}{Q_{10}^+}$$

and no physically realizable solution is possible since we also know that $$\frac{1}{Q_e}>0$$

Accordingly, a comprise solution must be made. For example, we assume in a first case that $P_{10}^-$ is not zero and $P_{10}^+$ is. That is, we shall permit a portion of the incident $TE_{10}$ mode wave energy to be reradiated back towards the source (guide 31 in FIG. 3).

If $P_{10}^+$ is zero, $$\frac{1}{Q_L}=\frac{2}{Q_{10}^+}$$

and Equations 14 to 17 become $$P_{10}^-=\frac{Q_{10}^+}{Q_{10}^-} \quad (22)$$

$$P_{10}^+=0 \quad (23)$$

$$P_{20}^+=\frac{Q_{10}^+}{Q_{20}^s} \quad (24)$$

and $$P_a=\frac{Q_{10}^+}{Q_e} \quad (25)$$

Since $$\frac{1}{Q_e}=\frac{1}{Q_{10}^+}-\frac{1}{Q_{10}^-}-\frac{1}{Q_{20}^s}$$

we get from Equations 18 to 21 that $$\frac{1}{Q_e}=\frac{\pi M v}{a^2 b H_0}\left\{\sin\left(\frac{2\pi x}{a}\right)-4\left[\frac{a}{\lambda_{20}}\sin^2\left(\frac{2\pi x}{a}\right)\cos^2\left(\frac{2\pi z_0}{\lambda_{20}}\right)+\frac{\lambda_{20}}{a}\cos^2\left(\frac{2\pi x}{a}\right)\sin^2\left(\frac{2\pi z_0}{\lambda_{20}}\right)\right]\right\} \quad (26)$$

Upon examination of Equation 26 it is noted that the term within the brackets [] is the spatially varying part of $$\frac{1}{Q_{20}^s} \text{ and } \sin\left(\frac{2\pi x}{a}\right)$$

is the spatially varying part of $$\left(\frac{1}{Q_{10}^+}-\frac{1}{Q_{10}^-}\right)$$

Since we want to maximize $P_{20}^+$, we want the term within the brackets [] to be as large as possible. However, we also want the term within braces {} to be as large as possible since, for any of the available materials, $1/Q_e$ is defined and we would want the volume $v$ to be as small as possible. To maximize the term {} and still have the term [] as large as possible, we select $$\sin\frac{2\pi x}{a}=1$$

Hence, the optimum distance $x_0$ from the guide wall is given by $$x_0=\frac{a}{4} \quad (27)$$

For this value of $x$, $$\frac{1}{Q_{e(x=x_0)}}=\frac{\pi M v}{a^2 b H_0}\left\{1-\frac{4a}{\lambda_{20}}\cos^2\frac{2\pi z_0}{\lambda_{20}}\right\} \quad (28)$$

For any given gyromagnetic material and guide dimensions, the distance $z_0$ can be calculated from Equation 28. However, since the distance $z_0$ is measured from a virtual short rather than some physical short, the location of the gyromagnetic element is made first by expressing $z_0$ in terms of the guide wavelength for the $TE_{20}$ mode and then making standing wave measurements in the empty multimode guide. From these measurements, the location of the virtual short and, hence, the distance $z_0$ can be determined.

Table 1, given for purposes of illustration, is a tabulation of the idealized mode conversion efficiency of a system designed as explained above. It is idealized in that it is assumed that no power is dissipated in the gyromagnetic material.

| Guide Width $a$ | $P_{20}^+$ | $P_{10}^-$ |
|---|---|---|
| | *Percent* | *Percent* |
| Slightly larger than $\lambda_0$* | 84 | 16 |
| 1.5 $\lambda_0$ | 97 | 3 |

*$\lambda_0$ is the free-space wavelength.

*Table 1*

A similar analysis can be made based upon the assumption that the reflected component of the $TE_{10}$ mode is zero (that is, $P_{10}^-=0$). When this is done we find the optimum location ($x_0$ and $z_0$) of the gyromagnetic element to be given by $$\sin\frac{\pi x_0}{a}=\frac{\lambda_0}{2a} \quad (29)$$

and $$z_0=\frac{\lambda_{20}}{2} \quad (30)$$

where $\lambda_0$ is the free-space wavelength, and $\lambda_{20}$ is the guide wavelength for the $TE_{20}$ mode.

The gyromagnetic sample is selected such that the product ($M v Q_e$) is a maximum, with the practical limitation on the volume being that the largest dimension (that is, the diameter, in the case of a sphere) be no greater than about 15% of the guide width.

Table 2, given for purposes of illustration, is a tabulation of the idealized mode conversion efficiency of a system so designed.

| Guide Width $a$ | $P_{20}^+$ | $P_{10}^+$ |
|---|---|---|
| | *Percent* | *Percent* |
| Slightly larger than $\lambda_0$ | 70 | 30 |
| 1.5 $\lambda_0$ | ≈100 | 0 |

*Table 2*

In both of the examples described above, there is a residual component of $TE_{10}$ mode wave energy. In the first example, there is a component which propagates back towards the source. In the second example described, there is a forward propagating component. These may be small enough in some situations to be neglected. If they are not negligible, however, means such as resistive vanes or gyromagnetic nonreciprocal actuators can be used to absorb this spurious power. Alternatively, matching elements, placed in the dominant mode guide, can be used to reflect the backward traveling component toward the gyromagnetic material.

A mode converter of the type described above can be used in a variety of ways. One such use is described by G. C. Southworth at page 362 of his book Principles and Applications of Waveguide Transmission wherein a $TE_{10}^\square$ to $TE_{20}$ mode converter is used as an element of a $TE_{10}$ to $TE_{01}^\circ$ mode converter. Another use is illustrated in FIG. 6 wherein mode conversion effects are used to obtain frequency discrimination.

In FIG. 6 there is shown a frequency discriminator comprising a section of dominant mode waveguide 60, a quarter-wave transition section 61 and a section of multimode waveguide 62. Guide 62 is proportioned to support the $TE_{10}$ and the $TE_{20}$ modes of propagation but to be cut-off for higher order modes. Thus, the wide dimension of guide 62 is greater than one free-space wavelength at the operating frequency but less than 3/2 wavelengths. For the purposes of this device, the guide width is preferably as large as possible consistent with the above-mentioned limits.

An element of reasonantly biased gyromagnetic material 63 is asymmetrically located in guide 62 in accordance with the teachings of the first example given above. That is, element 63 is located a distance $x_0$ from one of the narrow walls of guide 62 and a distance $z_0$ from the virtual short produced by the dominant mode guide 60.

Located along the center of guide 62 is a conductive vane 64 which extends the full height of the guide, thereby dividing guide 62 into two substantially equal, reduced width guides 65 and 66. Each of these reduced width guides is supportive of $TE_{10}$ mode wave energy but is cut-off for higher order modes.

Signal detecting and rectifying means are coupled to each of the guides 65 and 66 in a manner to measure the difference in the amplitudes between signals in these two guides. In FIG. 6 a pair of similarly poled diodes 67 and 68 is used for this purpose. Diode 67, centrically located in guide 65, is connected with its anode grounded to the lower wide wall of the guide. The cathode of diode 67 is connected through a filter network 70 to output terminals 1. Similarly diode 68, centrically located in guide 66, has its anode electrode grounded to the lower wide wall of guide 68 and its cathode connected to the other output terminal 2 through filter 70. In this manner, when the signal amplitudes in the two guides are equal, the net output voltage at terminals 1–2 is zero. If the signal in guide 65 is greater than the signal in guide 66, the voltage at terminal 1 is negative with respect to the voltage at terminal 2 and, conversely, when the signal in guide 66 is larger than that in guide 65, the voltage at terminal 1 is positive with respect to the voltage at terminal 2.

In operation, the relative amplitudes of the signals in guides 65 and 66 varies as the frequency of the signal deviates from the resonant frequency to which the gyromagnetic material is biased. For example, let us consider the case when the signal and the gyromagnetic material are tuned to the same frequency. Dominant mode wave, energy incident from guide 60, is converted to $TE_{20}$ mode wave energy by the gyromagnetic material such that all the wave energy that propagates past the gyromagnetic material is in the $TE_{20}$ mode. Upon reaching the divided portion of guide 62, the $TE_{20}$ mode wave energy is converted into two equal, but out-of-phase $TE_{10}$ mode components in guides 65 and 66. This is illustrated in FIG. 7A. Since the two lobes of a $TE_{20}$ mode wave are equal in amplitude, the signal voltages in guides 65 and 66 are equal and there is no net output voltage between terminals 1 and 2.

As the signal deviates slightly from the resonant frequency of the gyromagnetic material, the mode conversion in the gyromagnetic material becomes less efficient resulting in a small component of $TE_{10}$ mode wave energy propagating past the gyromagnetic material along with the $TE_{20}$ mode wave energy. Upon reaching the divided portion of guide 63, the $TE_{10}$ mode wave energy divides equally between the two guides 65 and 66. However, the $TE_{10}$ mode wave energy divides in-phase in guides 65 and 66 whereas the $TE_{20}$ mode wave energy divides out-of-phase. This is illustrated in FIG. 7B. Since the signal components in guide 65 add in-phase, the resulting signal in guide 65 is slightly larger than the signal in guide 66 wherein the two signal components add out-of-phase.

The relative phase of the two wave components in guides 65 and 66 will depend upon the signal frequency relative to the resonant frequency of the gyromagnetic frequency. That is, as the signal frequency deviates to one side of gyromagnetic resonance, the signals in guide 65 are in-phase whereas those in guide 66 are out-of-phase. For signals on the other side of gyromagnetic resonances, the signals in guide 65 are out-of-phase whereas those in guide 66 are in-phase.

As the signal deviation from gyromagnetic resonance becomes larger, the mode conversion from $TE_{10}$ to $TE_{20}$ becomes less efficient until eventually the amplitude of the $TE_{20}$ mode component becomes negligibly small. As this occurs, the voltage in the two guides 65 and 66 again become equal and the difference voltage reduces to zero. This voltage variation results in the typical discriminator characteristic shown in FIG. 8.

The principles of the present invention can be readily applied to other arrangements and devices. For example, in FIG. 9 there is shown a $TE_{20}$ isolator comprising a section of waveguide having a wide internal cross-sectional dimension $a$ greater than one wavelength and less than one and one-half wavelength of the wave energy to be propagated therein. So proportioned, waveguide 80 is supportive of the $TE_{10}$ and $TE_{20}$ modes of wave propagation.

Located substantially midway between the wide walls and at a distance $x$ from one of the narrow walls is a small element of gyromagnetic material 81 suitably supported by means of a slab 82 of low-loss dielectric material.

A pair of longitudinally spaced resistive vanes 83 and 84 are located on opposite sides of element 81 midway between, and in a direction parallel to, the narrow walls of guide 80. So located, vanes 83 and 84 are in a region of the guide of minimum electric field intensity for the $TE_{20}$ mode but in a region of maximum electric field intensity for the $TE_{10}$ mode. The distance of the vanes from the gyromagnetic material is not critical.

To obtain efficient isolator action it is desirable that in the forward direction of propagation there be essentially no interaction between the incident $TE_{20}$ mode wave energy and either of the resistive vanes of the gyromagnetic material whereas for propagation in the reverse direction, substantially all the incident wave energy be absorbed. To satisfy this latter condition requires that there is no reflected or propagated component of $TE_{20}$ mode wave energy. These conditions can be satisfied if the incident $TE_{20}$ mode wave energy is either totally absorbed in the gyromagnetic material or partially absorbed in the gyromagnetic material and partially coupled to the $TE_{10}$ mode. Any energy thus coupled will then be absorbed in the resistive vanes.

For the reflected component of wave energy in the $TE_{20}$ mode to be zero requires that $P_{20}^-$, as defined by Equation 3, be zero.

That is, $$P_{20}^- = \frac{4Q_1^2}{Q_{20}^+ Q_{20}^-} = 0 \tag{31}$$

or $$\frac{1}{Q_{20}^-} = 0 \tag{32}$$

In terms of Equation 8, we get $$\frac{1}{Q_{20}^-} = \frac{\omega\mu M v}{8 H_{d_0} P_{20}} (H_{x_{20}}^+ - H_{z_{20}}^+)^2 = 0 \tag{33}$$

For a finite volume of material, this requires that $$(H_{x_{20}}^+ - iH_{z_{20}}^+) = 0$$

That is, that the gyromagnetic material be located in a region of circular polarization for the $TE_{20}$ mode wave energy.

To determine the location of the gyromagnetic material to satisfy this requirement, Equations 9 and 11 are equated and give $$\frac{2.2\pi^2}{\omega\mu a \lambda_{20}} \sin \frac{2\pi x}{a} = \frac{1}{\omega\mu} \left(\frac{4\pi^2}{a}\right) \cos \frac{2\pi x}{a} \tag{34}$$

Solving for $x$, we get $$x = \frac{a}{2\pi} \tan^{-1} \frac{\lambda_{20}}{a} \tag{35}$$

Expressing $\lambda_{20}$ in terms of its free-space wavelength $\lambda_0$ and the guide width $a$ $$\lambda_{20}=\frac{\lambda_0}{\sqrt{1-\left(\frac{\lambda_0}{a}\right)^2}} \tag{36}$$

The regions of circular polarization for the $TE_{20}$ mode can be expressed as either $$\sin\frac{2\pi x}{a}=\pm\frac{\lambda_0}{a} \tag{37}$$

or as $$\cos\frac{2\pi x}{a}=\pm\frac{\lambda_0}{\lambda_{20}} \tag{38}$$

Since the guide width $a$ is greater than $\lambda_0$ and less than $3/2\lambda_0$, there are four values of $x$ which satisfy Equations 37 and 38. Stated another way, there are four regions of circular polarization for the $TE_{20}$ wave within guide 80. These are indicated in FIG. 10 which is a schematic representation of the embodiment of FIG. 9, as regions 90, 91, 92 and 93. For wave energy propagating in the $+z$ direction and for the assumed direction of $H_{dc}$, the sense of rotation of the circularly polarized field in regions 91 and 93 is the same as the sense of rotation of the magnetic precession of the gyromagnetic material producing a strong interaction with the gyromagnetic material. For the regions 90 and 92, the sense of circular polarization of the magnetic field is opposite to the magnetic precess and there is esentially no interaction with the gyromagnetic material. Accordingly, the gyromagnetic material is placed in either regions 90 and 92 or 91 and 93 depending upon which direction of propagation is to be the high-loss direction and which direction of propagation is to be the low-loss direction.

The second requirement is that $P_{20}^+$ also be zero. From Equation 4 we then have $$P_{20}^+=Q_1^2\left(\frac{1}{Q_1}-\frac{2}{Q_{20}^+}\right)^2=0 \tag{39}$$

or $$\frac{1}{Q_1}-\frac{2}{Q_{20}^+}=0 \tag{40}$$

and $$\frac{1}{Q_1}=\frac{2}{Q_{20}^+} \tag{41}$$

From Equation 2 we have that $$\frac{1}{Q_1}=\frac{1}{Q_e}+\frac{1}{Q_{10}^+}+\frac{1}{Q_{10}^-}+\frac{1}{Q_{20}^+}+\frac{1}{Q_{20}^-} \tag{42}$$

and therefore $$\frac{1}{Q_{20}^+}=\frac{1}{Q_e}+\frac{1}{Q_{10}^+}+\frac{1}{Q_{10}^-}+\frac{1}{Q_{20}^-} \tag{43}$$

Making the appropriate substitutions for the several Q's from Equations 7 and 8 and noting that $$\frac{1}{Q_{20}^-}=0$$

we obtain as one result $$(x''-k'')v=\frac{ab}{\pi}\left\{\frac{1}{\frac{2\lambda_0^2}{a^2\lambda_{20}}-\frac{\lambda_{10}}{8}\left[\frac{1}{\lambda_{10}^2}\left(1-\frac{\lambda_0}{\lambda_{20}}\right)+\frac{1}{a^2}\left(1+\frac{\lambda_0}{\lambda_{20}}\right)\right]}\right\} \tag{44}$$

for $$\sin\left(\frac{2\pi x}{a}\right)=\pm\frac{\lambda_0}{a} \text{ and } \cos\left(\frac{2\pi x}{a}\right)=\frac{\lambda_0}{\lambda_{20}}$$

where $(x''-k'')$ is the susceptibility at resonance and for a sphere of gyromagnetic material, is given by $2MQ_e/H_0$.

$$\cos\frac{2\pi x}{a}=-\frac{\lambda_0}{\lambda_{20}} \text{ and } \sin\frac{2\pi x}{a}=\pm\frac{\lambda_0}{a}$$

is as follows:

$$(x''-k'')v=\frac{ab}{\pi}\left\{\frac{1}{\frac{2\lambda_0^2}{a^2\lambda_{20}^2}-\frac{\lambda_{10}}{8}\left[\frac{1}{\lambda_{10}^2}\left(1+\frac{\lambda_0}{\lambda_{20}}\right)-\frac{1}{a^2}\left(1-\frac{1}{\lambda_{20}}\right)\right]}\right\} \tag{45}$$

Either of the above solutions are appropriate and represent a condition of critical coupling to the gyromagnetic material. If $$\lambda_0<a<\frac{\sqrt{5}}{2}\lambda_0$$

then solution (44) is preferred as it requires a smaller $(x''-k'')v$ product. If $$\frac{\sqrt{5}\lambda_0}{2}<a<\frac{3\lambda_0}{2}$$

then solution (45) is preferred for the same reason.

The equivalent circuit of the TE $_{20}$ isolator is as given in FIG. 11. Terminals 1 and 1' are the equivalent input and output ports for the $TE_{20}$ mode wave energy, and terminals 2 and 2' are the equivalent input and output ports for the $TE_{10}$ mode wave energy. The resistors 103 and 104 represent the resistive vanes 83 and 84. The circulators 100 and 101 and the cavity 102 represent the equivalent circuit of the gyromagnetic material and the reciprocal Q designations are indicative of the effective loading produced on the gyromagnetic material by the various components of the $TE_{20}$ and $TE_{10}$ modes.

In operation $TE_{20}$ mode wave energy is applied to terminal 1 and is coupled through circulator 100 to an equivalent terminal I of cavity 102. With the volume and resonant susceptibility of the gyromagnetic material proportioned in accordance with Equations 44 or 45, cavity 102 is critically coupled to the incident wave and no energy is reflected back from terminal I. Hence no energy is coupled between terminals 1 and 1'. The gyromagnetic material, however, is excited by the incident $TE_{20}$ mode wave energy. Some of the energy is dissipated in the material while the rest is reradiated in the $TE_{10}$ mode. In the equivalent circuit of FIG. 11, energy is coupled out of cavity 102 at terminals III and IV and applied to circulator 101. The $TE_{10}$ mode energy, however, is dissipated in the resistors 103 and 104, none of it reaching the equivalent terminals 2 or 2'.

While the gyromagnetic material is also inherently capable of reradiating wave energy in the $TE_{20}$ mode, by locating the gyromagnetic material in a region of circular polarization for the $TE_{20}$ mode, the loading produced at terminal II of cavity 102 is zero. This is equivalent to an open circuit 105 in the connection between terminal II and circulator 100 and, therefore, no $TE_{20}$ mode wave energy is coupled from cavity 102 back to circulator 100 and hence to terminal 1.

For propagation in the direction from terminal 1' to terminal 1 (the low-loss direction), the wave energy enters circulator 100 and in the general case, would be coupled to equivalent terminal II of cavity 102. However, since for this direction of propagation the gyromagnetic material is in a region of circular polarization whose sense of rotation is opposite to the natural precessional sense of rotation of the magnetic moment in the gyromagnetic material, there is no interaction between the wave and the gyromagnetic element. This is signified by the open circuit 105 between circulator 100 and terminal II. Thus, wave energy entering circulator 100 from terminal 1' is totally reflected back to circulator 100 by open circuit 105 and, hence, to terminal 1. Aside from incidental copper and dielectric losses in the circuit, all the incident wave energy for this direction of propagation is freely propagated past element 81.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. In an electromagnetic wave transmission system;
a first section of waveguide supportive of wave energy at a given frequency;
a second section of waveguide having sufficiently larger cross-sectional dimensions to support said wave energy at said given frequency in a mode of propagation incapable of being supported in said first section of waveguide;
transition means for coupling said waveguide sections;
and an element of gyromagnetic material magnetically biased to gyromagnetic resonance at said given frequency asymmetrically located within said second section of waveguide.

2. The combination according to claim 1 wherein;
said first section of waveguide is a rectangular waveguide exclusively supportive of the $TE_{10}$ mode of wave propagation;
said second section of waveguide is a rectangular waveguide supportive of the $TE_{10}$ and the $TE_{20}$ modes of wave propagation;
and wherein said gyromagnetic material is located in said second section in a region of circular polarization for said $TE_{10}$ mode.

3. The combination according to claim 1 wherein;
said second section of waveguide is a rectangular waveguide whose wide dimension is $a$;
and wherein said gyromagnetic material is asymmetrically located a distance $a/4$ from the center of said guide.

4. A mode converter for converting $TE_{10}$ mode wave energy to $TE_{20}$ mode wave energy comprising:
a section of dominant mode waveguide supportive of wave energy in the $TE_{10}$ mode exclusively;
a section of multimode waveguide supportive of wave energy in the $TE_{10}$ and $TE_{20}$ modes to the exclusion of higher order modes;
transition means for coupling said waveguide sections;
an element of resonantly biased gyromagnetic material asymmetrically located in said multimode guide;
means for coupling $TE_{10}$ mode wave energy into said dominant mode wave guide;
and means for coupling $TE_{20}$ mode wave energy out of said multimode wave guide.

5. The combination according to claim 4 wherein;
said gyromagnetic material is located a distance $x_0$ from the narrow side of said multimode guide and a distance $z_0$ from the virtual short produced by said dominant mode guide where $x_0$ and $z_0$ are defined by $$x_0=\frac{a}{4}$$

and $$\frac{1}{Q_{e(x=x_0)}}=\frac{\pi M v}{a^2 b H_0}\left\{1-\frac{4a}{\lambda_{20}}\cos^2\frac{2\pi z_0}{\lambda_{20}}\right\}$$

where:
$a$ is the wide dimension of the multimode guide,
$b$ is the narrow dimension of the multimode guide,
$Q_e$ is the intrinsic Q of the gyromagnetic material,
M is the saturation magnetization of the gyromagnetic material,
$H_0$ is the amplitude of biasing field to produce gyromagnetic resonance in said material at the operating frequency,
$v$ is the volume of the gyromagnetic material, and
$\lambda_{20}$ is the guide wavelength of $TE_{20}$ mode wave energy.

6. The combination according to claim 4 wherein;
said gyromagnetic material is located a distance $x_0$ from the narrow side of said multimode waveguide and a distance $z_0$ from the virtual short produced by said dominant mode guide where $x_0$ and $z_0$ are defined by $$\sin\frac{\pi x_0}{a}=\frac{\lambda_0}{2a}$$

and $$z_0=\frac{\lambda_{20}}{2}$$

where:
$a$ is the wide dimension of said multimode guide,
$\lambda_0$ is the free-space wavelength at the operating frequency, and
$\lambda_{20}$ is the guide wavelength of the $TE_{20}$ mode wave energy.

7. In an electromagnetic wave transmission system supportive of wave energy in the $TE_{10}$ and $TE_{20}$ modes, a $TE_{20}$ mode isolator comprising:
a rectangular waveguide having a pair of wide walls whose internal transverse dimension is greater than the free-space wavelength of wave energy to be propagated therethrough and less than 3/2 said wavelength;
a pair of longitudinally spaced resistive vanes located in the region of maximum electric field intensity for said $TE_{10}$ mode of wave propagation;
and an element of resonantly biased gyromagnetic material located between said vanes in a region of circular polarization for said $TE_{20}$ mode of wave propagation.

8. The combination according to claim 7 wherein;
said waveguide has a wide dimension $a$ and a narrow dimension $b$;
and wherein said material is located at a distance $x$ from one of the narrow walls of said guide and has a volume $v$ given respectively by $$\sin\left(\frac{2\pi x}{a}\right)=\frac{\lambda_0}{a}$$

and $$\cos\left(\frac{2\pi x}{a}\right)=\frac{\lambda_0}{\lambda_{20}}$$

and $$v=\frac{ab}{\pi(x''-k'')}\left\{\frac{1}{\frac{2\lambda_0^2}{a^2\lambda_{20}}-\frac{\lambda_{10}}{8}\left[\frac{1}{\lambda_{10}^2}\left(1-\frac{\lambda_0}{\lambda_{20}}\right)+\frac{1}{a^2}\left(1+\frac{\lambda_0}{\lambda_{20}}\right)\right]}\right\}$$

where:
$(x''-k'')$ is the susceptibility of the gyromagnetic material at resonance,
$\lambda_0$ is the free-space wavelength at the operating frequency,
$\lambda_{10}$ is the guide wavelength for the $TE_{10}$ mode of wave propagation, and
$\lambda_{20}$ is the guide wavelength for the $TE_{20}$ mode of wave propagation.

9. The combination according to claim 7 wherein;
said waveguide has a wide dimension $a$ and a narrow dimension $b$;
and wherein said material is located at a distance $x$ from one of the narrow walls of said guide and has a volume $v$ given respectively by $$\cos\left(\frac{2\pi x}{y}\right)=\frac{\lambda_0}{\lambda_{20}}$$

and $$\sin\left(\frac{2\pi x}{a}\right)=-\frac{\lambda_0}{a}$$

and $$v=\frac{ab}{\pi(x''-k'')}\left\{\frac{1}{\frac{2\lambda_0^2}{a^2\lambda_{20}}-\frac{\lambda_{10}}{8}\left[\frac{1}{\lambda_{10}^2}\left(1-\frac{\lambda_0}{\lambda_{20}}\right)+\frac{1}{a^2}\left(1+\frac{\lambda_0}{\lambda_{20}}\right)\right]}\right\}$$

where:

($x''-k''$) is the susceptibility of the gyromagnetic material at resonance, $\lambda_0$ is the free-space wavelength at the operating frequency, $\lambda_{10}$ is the guide wavelength for the $TE_{10}$ mode of wave propagation, and $\lambda_{20}$ is the guide wavelength for the $TE_{20}$ mode of wave propagation.

10. The combination according to claim 7 wherein;

said waveguide has a wide dimension $a$ and a narrow dimension $b$;

and wherein said material is located at a distance $x$ from one of the narrow walls of said guide and has a volume $v$ given respectively by $$\sin\left(\frac{2\pi x}{a}\right)=-\frac{\lambda_0}{a}$$

and $$\cos\left(\frac{2\pi x}{a}\right)=-\frac{\lambda_0}{\lambda_{20}}$$

and $$v=\frac{ab}{\pi(x''-k'')}\left\{\frac{1}{\frac{2\lambda_0^2}{a^2\lambda_{20}}-\frac{\lambda_{10}}{8}\left[\frac{1}{\lambda_{10}^2}\left(1+\frac{\lambda_0}{\lambda_{20}}\right)-\frac{1}{a^2}\left(1-\frac{\lambda_0}{\lambda_{20}}\right)\right]}\right\}$$

where:

($x''-k''$) is the susceptibility of the gyromagnetic material at resonance, $\lambda_0$ is the free-space wavelength at the operating frequency, $\lambda_{10}$ is the guide wavelength for the $TE_{10}$ mode of wave propagation, and $\lambda_{20}$ is the guide wavelength for the $TE_{20}$ mode of wave propagation.

11. The combination according to claim 7 wherein;

said waveguide has a wide dimension $a$ and a narrow dimension $b$;

and wherein said material is located at a distance $x$ from one of the narrow walls of said guide and has a volume $v$ given respectively by $$\cos\left(\frac{2\pi x}{a}\right)=-\frac{\lambda_0}{\lambda_{20}}$$

and $$\sin\frac{2\pi x}{a}=\frac{\lambda_0}{a}$$

and $$v=\frac{ab}{\pi(x''-k'')}\left\{\frac{1}{\frac{2\lambda_0^2}{a^2\lambda_{220}}-\frac{\lambda_{10}}{8}\left[\frac{1}{\lambda_{10}^2}\left(1+\frac{\lambda_0}{\lambda_{20}}\right)-\frac{1}{a^2}\left(1-\frac{\lambda_0}{\lambda_{20}}\right)\right]}\right\}$$

where:

($x''-k''$) is the susceptibility of the gyromagnetic material at resonance, $\lambda_0$ is the free-space wavelength at the operating frequency, $\lambda_{10}$ is the guide wavelength for the $TE_{10}$ mode of wave propagation, and $\lambda_{20}$ is the guide wavelength for the $TE_{20}$ mode of wave propagation.

12. A frequency discriminator comprising:

a length of rectangular waveguide supportive of wave energy in the $TE_{10}$ and $TE_{20}$ modes of wave propagation;

an element of resonantly biased gyromagnetic material asymmetrically located within said guide;

means for dividing a portion of said guide into two equal reduced width sections;

and means located within each of said sections for measuring the amplitude of wave energy therein.

References Cited by the Examiner

UNITED STATES PATENTS

| | | | |
|---|---|---|---|
| 2,961,617 | 11/1960 | Stern | 333—24.1 |
| 3,011,134 | 11/1961 | Reingold | 333—1.1 |
| 3,040,276 | 6/1962 | Trambarulo | 333—24.2 |
| 3,099,805 | 7/1963 | Berk et al. | 333—24.1 |

OTHER REFERENCES

Bell System Technical Journal, A.T. & T., January 1955 TKI B435, pages 22, 24, 25, and 52.

Lax et al.: Microwave Ferrites, Lincoln Lab. Publ., received Jan. 7, 1962, pages 356–367 relied upon.

Southworth: Principles and Application of Waveguide Transmission, Van Nostrand, New Jersey, 1950, pages 114 and 356. QC 661S68.

HERMAN KARL SAALBACH, *Primary Examiner.*

ELI LIEBERMAN, *Examiner.*